United States Patent [19]

McNeese

[11] 4,080,100
[45] Mar. 21, 1978

[54] WIND MOTOR

[76] Inventor: Walter C. McNeese, Rte. 2, Calhan, Colo. 80808

[21] Appl. No.: 727,603

[22] Filed: Sep. 28, 1976

[51] Int. Cl.² ............................................. F03D 1/02
[52] U.S. Cl. .................................... 416/189; 416/11; 416/121
[58] Field of Search ........................................ 415/2–4; 416/10, 11, 121, 189, 193, 197 A, 235, 243

[56] References Cited

U.S. PATENT DOCUMENTS

| | | | |
|---|---|---|---|
| 327,370 | 9/1885 | Williams | 416/189 |
| 1,707,235 | 4/1929 | Sargent | 416/11 |
| 2,137,559 | 11/1938 | Algee | 416/189 |
| 2,302,054 | 11/1942 | Putt | 416/235 X |

FOREIGN PATENT DOCUMENTS

| | | | |
|---|---|---|---|
| 1,036,341 | 9/1953 | France | 416/11 |
| 123,095 | 10/1927 | Switzerland | 416/189 |
| 162,999 | 5/1921 | United Kingdom | 416/11 |
| 175,922 | 3/1922 | United Kingdom | 416/189 |
| 182,700 | 7/1922 | United Kingdom | 416/11 |
| 213,022 | 3/1924 | United Kingdom | 416/11 |

Primary Examiner—Everette A. Powell, Jr.
Attorney, Agent, or Firm—Clarence A. O'Brien; Harvey B. Jacobson

[57] ABSTRACT

A wind motor having a double set of rotor blades of special configuration mounted between a central hub and an outer rim. The front rotor has an extending shroud protruding well in front of the blades for capturing the prevailing wind. The center of the rotor is solid with the blades at the center being configured so as to be substantially at right angles to the wind flow and thus form a substantially solid area at the center of the rotor. The specially configured blades angle away from the center hub with a backward tilt of approximate 10°. Also, the blades twist so that the portion attached to the rim or shroud of the device present an air foil effect with tip structure for the leading edge being approximately 45° from the axis while the trailing edge is similarly at approximately a 45° angle in the opposite plane. The second rotor structure has similarly configured blade structure with one embodiment of the device providing the second rotor on the same shaft as the first rotor, while another embodiment has the second rotor mounted on another tubular member from the shaft on which the first rotor is mounted and also provided for rotation counter in direction to the rotation of the first rotor. An enlarged rim shroud structure is also provided with the second embodiment to enable wind flow to be directly applied to the second rotor in addition to the exhaust from the first rotor. Another feature of the first embodiment is the mounting of the pivotal support for the wind motor directly under the front rotor thus eliminating any need for a tail to hold the device directly into the wind. Appropriate power takeoff structure is also provided for each of the embodiments.

9 Claims, 7 Drawing Figures

WIND MOTOR

BACKGROUND OF THE INVENTION

1. Field of the Invention

This invention relates generally to devices for extracting power from the prevailing wind in order to supply useful energy to load devices.

2. Description of the Prior Art

A common problem with known type windmill-type power supply devices is that they are relatively inefficient in extracting the energy inherent in the prevailing winds in most areas of the country and in turning same into useful energy.

Another problem with known-type devices of the common and conventional-type windmill construction is that they are fairly fragile and susceptible to damage by extremely strong winds, and especially winds of hurricane-type force.

Another problem with known-type wind motor devices is that they are unduly complicated and require many component parts which greatly increase the cost of same as well as the maintenance of same.

Known prior art patents which may be pertinent to this invention are as follows, U.S. Pat. Nos.: 197,419, W. D. Smith, Nov. 20, 1877; 756,616, A. Fornander, Apr. 5, 1904; 1,316,139, H. M. Cake, Sept. 16, 1919; 1,467,515, T. B. Stewart, Sept. 11, 1923; 2,177,801, R. A. Erren, Oct. 31, 1939; 3,038,307, U. Oprecht, June 12, 1962.

None of these known prior art devices offers the new and unique features of the invention disclosed herein.

SUMMARY OF THE INVENTION

An object of the present invention is to provide a wind motor of greater efficiency and of less complexity than conventional motors of this type.

Another object of the present invention is to provide a wind motor having a pair of rotors with specially configured blades as part of the rotor structure for increasing the efficiency of extraction of energy from the wind passing said rotors.

A further object of this invention is to provide a plurality of rotor devices having associated shroud structure for catching and partially compressing the wind to increase the overall performance of the device.

A still further object of this invention is to provide a wind motor having a mounting structure with a pivot point either directly underneath the front rotor, or slightly in front of same so that the overall structure will automatically face with the front into the prevailing wind without the use of any additional tail or vane structure.

Another object of this type mounting is for a power takeoff from the rotors through conventional type bevel gearing and takeoff structure.

Another additional further object of this invention is to provide a wind motor having counter rotating front and rear rotor structure with specially configured blade structure and the one rotor being mounted on a power extraction shaft while the other rotor is mounted upon a tubular driven member concentric about the first shaft with power takeoff means connected to the respective driven shaft and tubular member.

A still additional object of this invention is to provide shroud structure associated with the rotors of the wind motors for guiding and partially compressing the prevailing wind as needed for operation of the wind motor.

Still another object of this invention is the provision of specially configured rotor blades having a central hub portion with the blades attached thereto being substantially curved with a major portion of the blades being at right angles to the axis of the rotor to present an almost complete obstruction over the central area of the rotor for the wind passing therethrough and with the outer ends of the blades being angled backwardly at approximately 10° from the vertical and shaped and twisted so that the outer portions of said blades have a leading edge at approximately a 45° angle from the longitudinal axis of the rotor and the trailing edge being at approximately 45° in the opposite plane from the leading edge so that the leading and trailing edges are basically perpendicular to one another with a curved portion therebetween which functions as an air foil type construction.

The wind motor construction of this invention has a number of very important features. Basically, two rotor structures are provided with appropriate shroud structure associated with at least the front rotor and at least one embodiment of the device having additional specially configured shroud structure associated with the second rotor. The shroud structures aid in increasing the efficiency of the overall wind motor in that the shroud structure guides the wind into the blade structure and also slightly increases the compression thereof. Additional vane guide structure may be provided within the shroud structure of either a fixed or adjustable nature to vary the effect of this arrangement.

The blades for the rotor structures are of special configuration and are arranged so that the central or inner portion of the multiple blades which are attached to a central hub substantially block the air flow at the center of the device. This is accomplished by the blades being formed of two substantially equal portions at right angles to each other with a curved connection therebetween. Thus mounted upon the central hub, the plurality of blades form a central area which almost completely blocks the air flow therethrough. As the blades extend outwardly from the central hub, they are tilted backwardly at an angle of at least 10° for the purpose of effecting an outward flow path for the wind passing through the rotor. The outer portions of the rotor blades are also of special configuration and are twisted from the angle at which the inner portions are placed so that a small leading edge is at approximately a 45° angle to the longitudinal axis of the rotor while the larger trailing edge is at approximately a 45° angle from the horizontal axis in the opposite plane from that of the leading edge, thus forming approximately a right angle between the leading and trailing surfaces of the blade with a curved portion therebetween which functions as an air foil.

Another important feature of the wind motor of this invention is in the arrangement of power takeoff from the rotor structure of same. This may be effected by a single common shaft with both of the rotor structures being secured thereto for drivingly transmitting power to the shaft and with any conventional-type power takeoff such as beveled gears associated therewith. Another feature is having the pivot point for the overall wind motor mounted at least at the same point as the center hub of the front rotor, and preferably slightly ahead of this point so that the body of the wind motor will function in its entirety as a wind vane in order to keep the front of the wind motor always into the prevailing wind. This arrangement eliminates any additional vane or tail structure for this purpose.

Another embodiment of this invention provides for the second rotor to be mounted on a tubular member separate from the driven shaft which is attached to the first rotor so that two driven members are connected to the power takeoff structure. This arrangement permits the rotors to operate at different speeds and even in counter rotation to each other for other desirable efficiency benefits. In addition, an additional enlarged shroud structure may be provided for the second rotor which will also capture a portion of the prevailing wind in addition to the exhaust wind from the first rotor.

These, together with other objects and advantages which will become subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
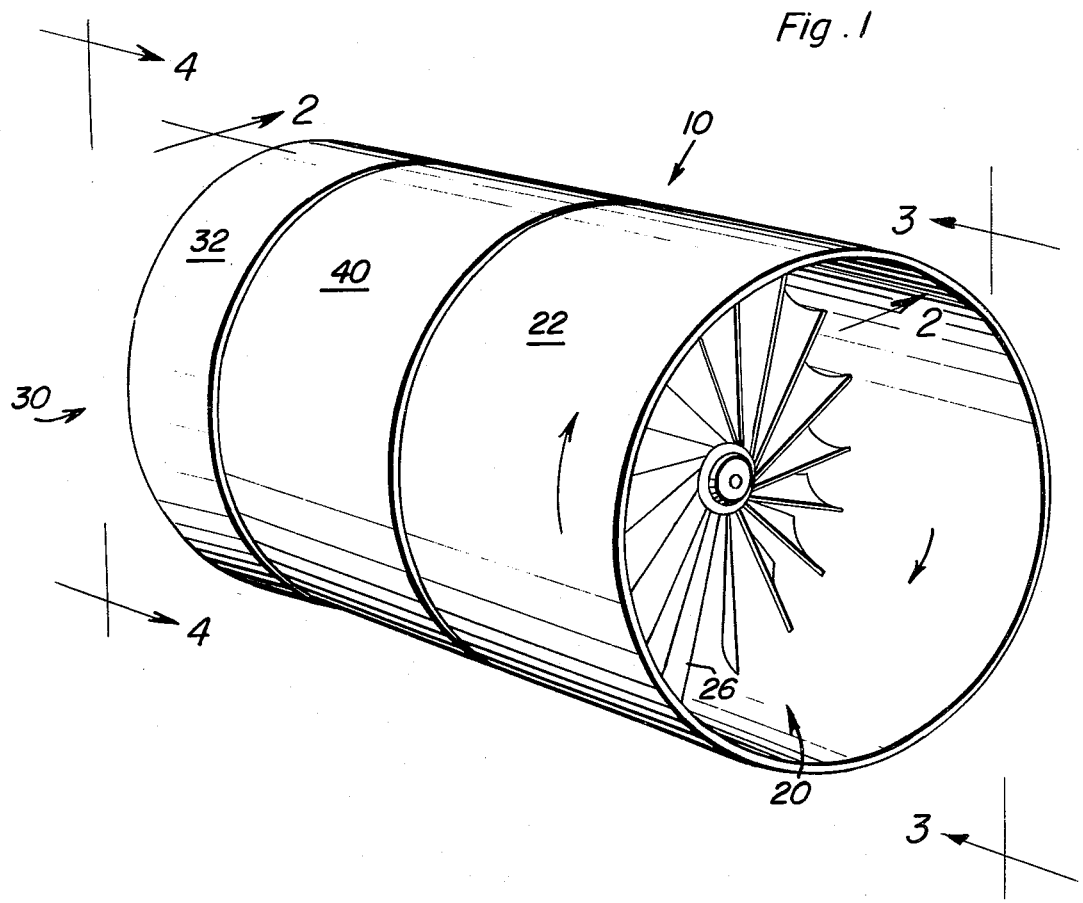
FIG. 1 is a perspective view of the wind motor of this invention.
Figure 5:
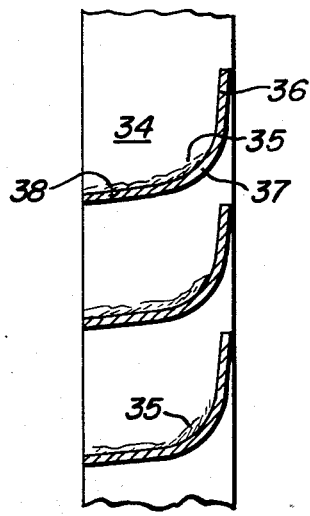
FIG. 5 is a cross-sectional view of three of the blades of special configuration close to the center hub structure, and taken generally along 5—5 of FIG. 4.
Figure 6:
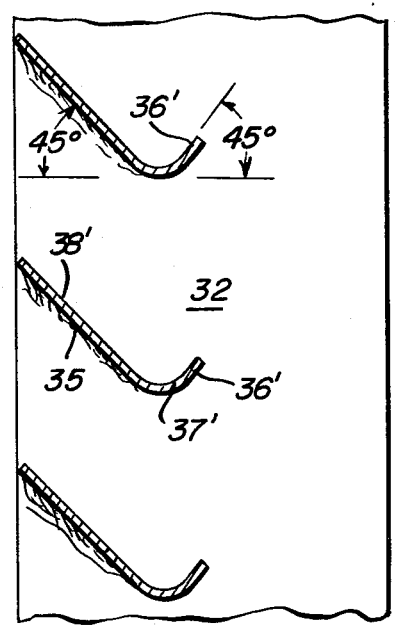
FIG. 6 is a cross-sectional view of three blades close to the outer rim of the rear rotor, taken generally along line 6—6 of FIG. 4.

Referring to FIG. 1 of the drawings, reference numeral 10 indicates in general the overall wind motor of this invention. This motor basically has a primary or first wind rotor structure 20 with a secondary wind rotor structure 30. The first wind rotor has an outer rim and shroud structure 22 while the second rotor is provided with an outer rim and shroud 32. An intermediate guide shroud 40 is also provided. Now looking at FIGS. 2-6, the special configuration of the blades of the respective rotors will be described in detail. The blades of both rotors are substantially identical so the description of one will also describe the other. Looking at the rear or leftmost motor in FIG. 2, the backwardly angled position of the outer portion of the blades with respect to the inner portion of approximately 10° may be easily seen. The inner portion of the blades as best seen in FIG. 5 consists of two portions of substantially the same size 36 and 38 with a rounded connecting portion 37. The portion 36 has an edge thereto which forms the leading edge of said blade. While the portion 38 has an edge which forms the trailing edge of the blade. Appropriate welding 35 integrally secures the blade to the central hub 34. As can be seen by looking at FIG. 5 as well as FIG. 4, the blades as attached to the hub in this manner substantially block any flow of air at the very center of the rotor, and in fact block the air flow for about 25% of the rotor surface. The outer portion of the blades which extend radially from the central hub 34 with the backward tilt of 10° are also specially configured as best seen in FIG. 6. The portion of the blade 36' which has the leading edge thereon is at substantially 45° from the longitudinal axis or rotational axis of the rotor. The trailing edge portion of the blade 38' also is angled at substantially 45° from the longitudinal axis but in the opposite plane from that of the leading edge so that the portions 36' and 38' basically are at right angles to each other and form a curved portion 36' therebetween which functions as an air foil structure. This air foil-type structure creates a vacuum along the portion 37', which is on the outside of the curve and thus creates a partial vacuum thereover which in effect functions like the wing of an airplane to cause a component force in the direction away from the curve. This is what in part effects the rotation of the rotor.

Figure 2:
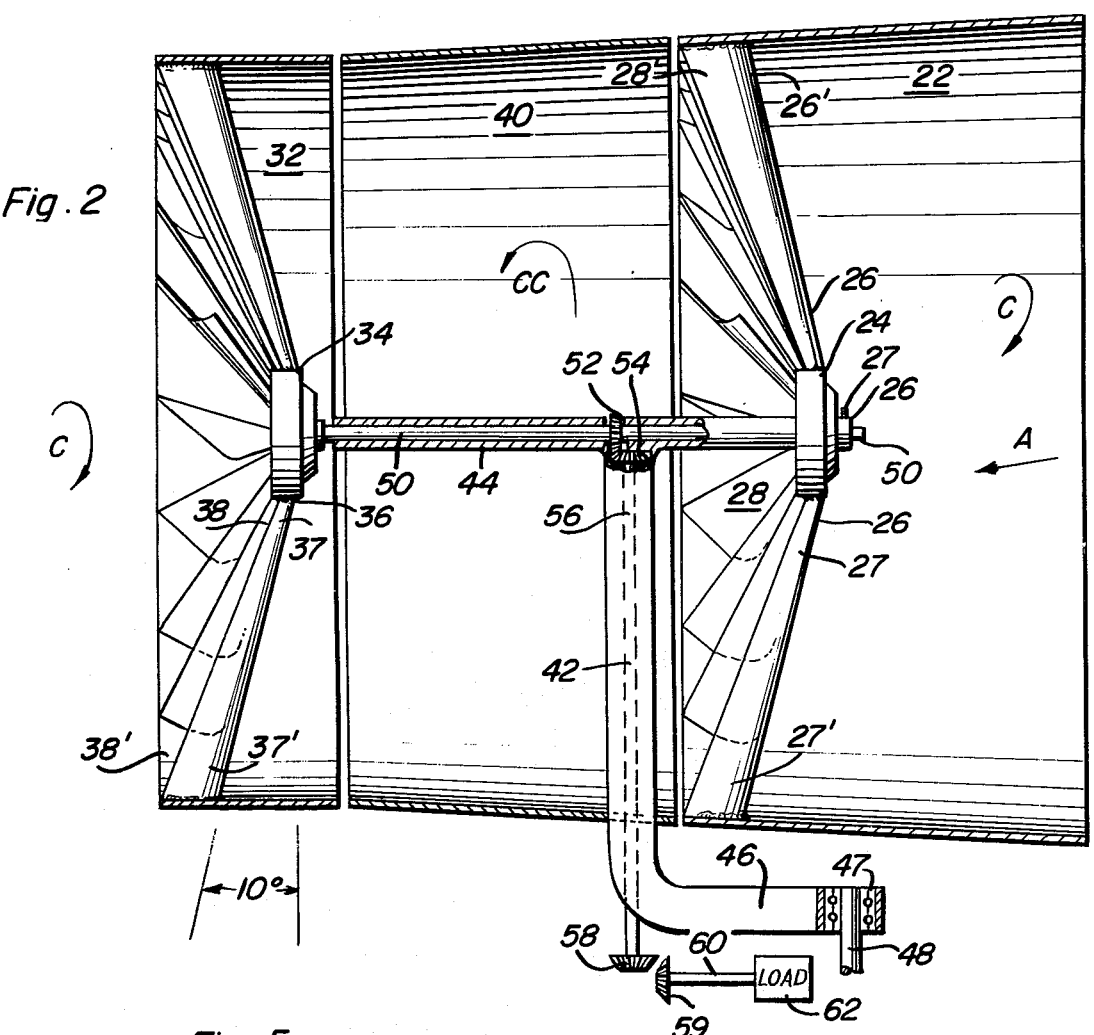
FIG. 2 is a side elevational view, partly in cross section, taken generally along line 2—2 of FIG. 1.

The front rotor is formed substantially the same as the rear rotor with outer portions 26', 27' and 28' attached to the outer rim and shroud 22 and with the inner portions of the blades 26, 27, 28 attached to the inner hub 24. The inner hub has a protruding portion thereon 26 which is appropriately tapped for a set screw 27 in order to maintain the rotor attached to shaft 50. The hub 34 is similarly provided with shaft attachment structure which may be of set screw type, or other conventional fastening means. The drive shaft 50 thus supports both the front rotor and the rear rotor fixedly thereupon and is in turn supported from a bearing structure 44 mounted upon the arm 42 which is pivotally supported by means of horizontal arm 46 and ballbearings or the like 47 mounted upon a support shaft 48. As seen in FIG. 2, one means of power takeoff may be beveled gears 52 and 54 connected to a shaft 56 mounted within the arm 42 with appropriate beveled gears 58, 59 connected to takeoff shaft 60 and connected to an appropriate load 62. This is one type of power takeoff which may be used, but the invention basically is in the specific arrangement of the rotors and the special blade shape thereof and any conventional-type power takeoff means may be used.

Another feature of this arrangement is in the pivotal bearing support 47, 48 as mounted just slightly ahead of the front rotor so that the overall wind motor will function as a self-aligning device and normally will automatically face into whatever prevailing wind is present. This arrangement eliminates any tails or additional vanes for guiding or aligning the overall wind motor with the wind and reduces the number of component parts as well as maintenance required.

Figure 7:
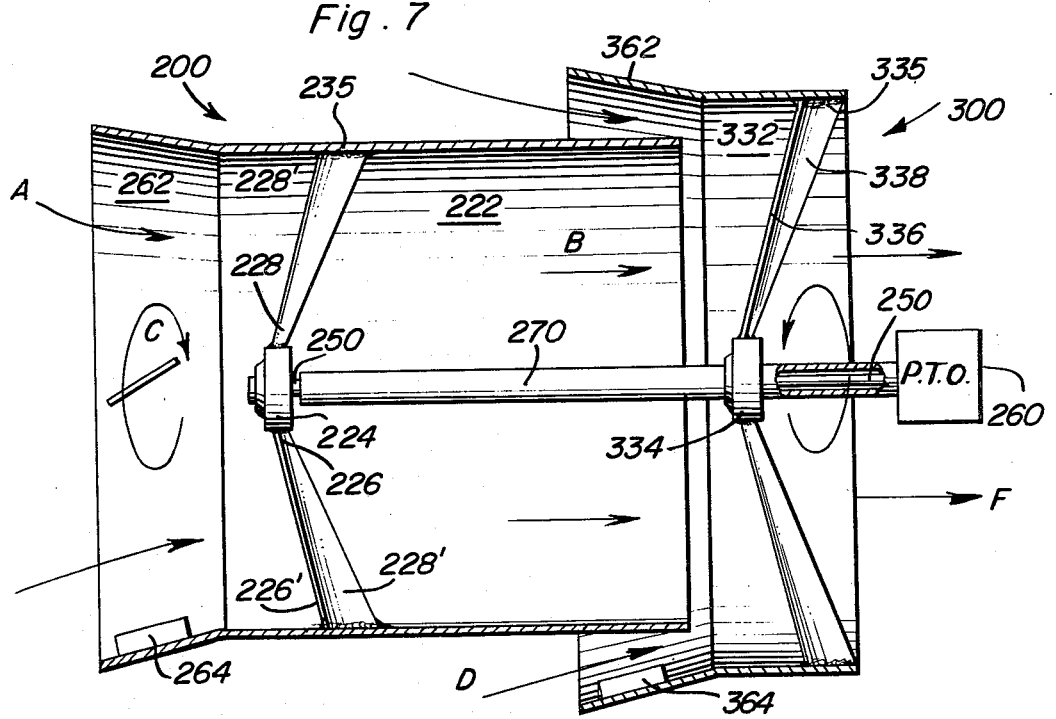
FIG. 7 is a side elevational view, partly in cross section, of a modified embodiment of the wind motor.

As can be seen, all the blades and rotors are welded and made of steel or similarly strong metal so that regardless of the magnitude of the wind, the chance of damage due to extremely strong winds, even of hurricane velocity is minimal. Adjustable vanes may be provided within the shroud's rim 22 of the front rotor, and similarly within the guide shroud 40, or within the rim 32. These guide vanes are not shown in this view, but a sample-type vane is depicted in the embodiment of FIG. 7 to be described below.

Figure 3:
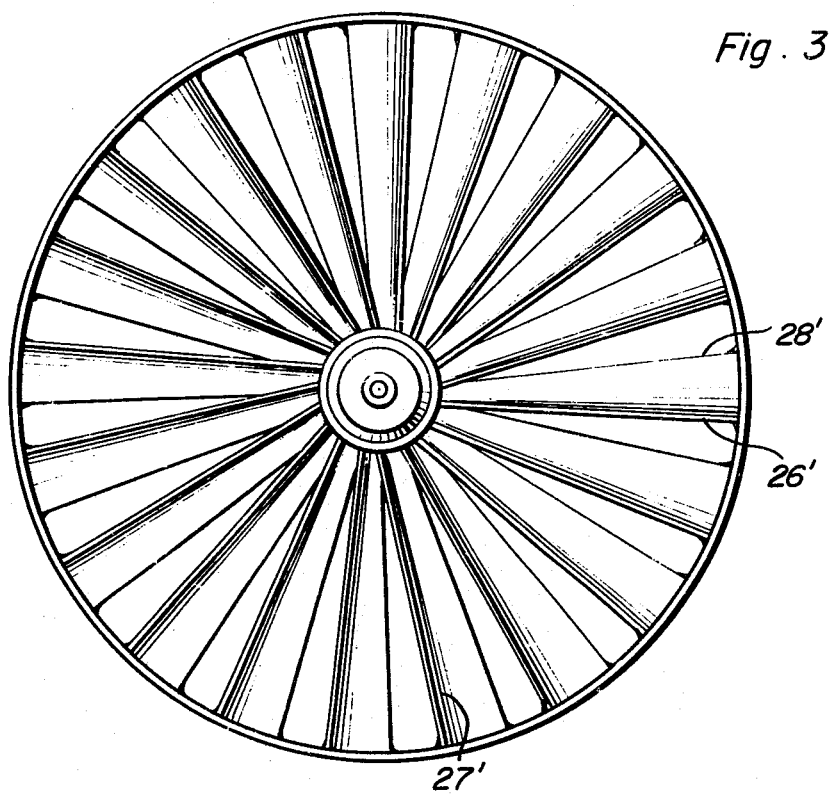
FIG. 3 is an end view from the front of the wind motor taken generally along line 3—3 of FIG. 1.
Figure 4:
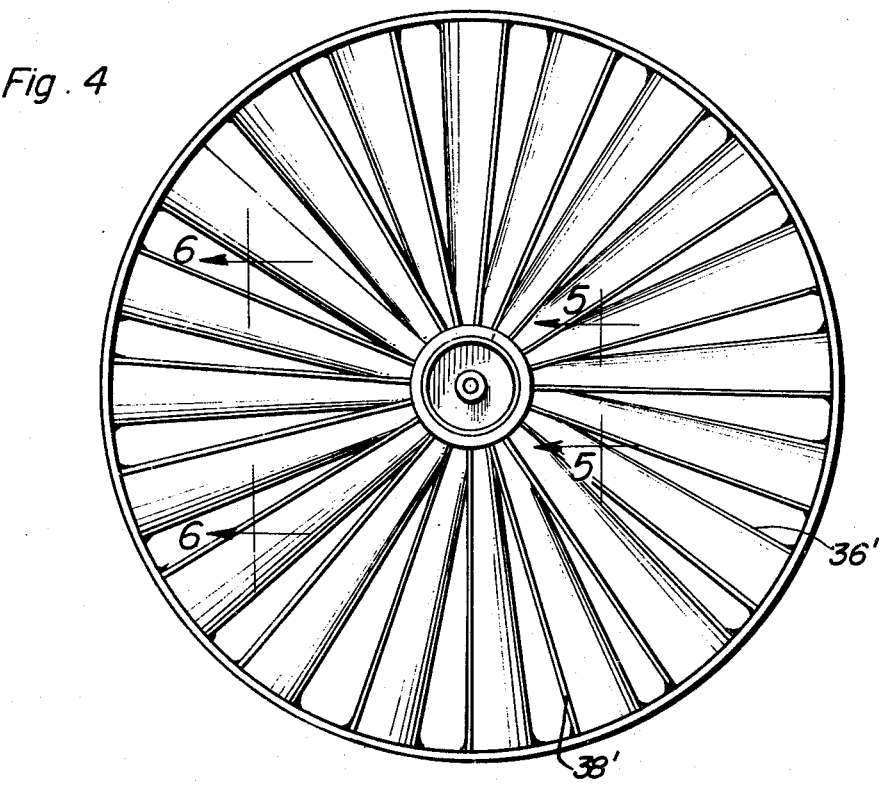
FIG. 4 is an end view from the rear of the wind motor taken generally along line 4—4 of FIG. 1.

The operation of this embodiment will now be described. The prevailing wind approaching the motor is captured by the first shroud 22 which is attached to the outer portion of the blade structure by welding and the like and protrudes well in front of the rotor blades. Therefore, all the air entering the shroud must pass through the blades and therefore produce power. Basically the center of the rotor, as perhaps best seen in FIG. 3, is solid, and even the blades at this center hub portion are perpendicular or at right angles to the direction of air flow. Since the blades are angled back at approximately 10° in their outer portion, air from the center tends to flow outwardly along the blades, thus becoming extremely turbulent as it mixes with the air flowing straight in. Air therefore is directed to the area furthest away from the center hub where it will produce the greatest power before passing through the blades. Since approximately 25% of the center area is solid, or blocked to air passage, approaching air applies pressure and compresses the air within the shroud, causing it to speed up and increase in pressure. Air approaching the rotor at, for example, 15 miles per hour, passes across the blades in excess of 20 miles per hour.

The leading edge of the blades on the outer portion, being angled at approximately 45° opposite to the direction of rotation, does not create drag, but rather causes air to speed up across the curved air foil portion of the blade, creating a partial vacuum and increasing blade rotation. This also supplies a channel for air to flow away from the center of the rotor. Extreme turbulence and slight compression is believed to be the key to the greater power capacities and increased efficiency of this design. Preliminary testing indicates approximately 10 horsepower output from a 36-inch model. Thus, on a 36-foot device an output power of approximately 600 horsepower should be achievable for a 15-mile per hour wind. This is more than four times the power produced by some Government sponsored projects.

The above air flow also applies to the second rotor where several additional factors enable it to produce even more power than the first. When the air leaves the first rotor, it is rotating counterclockwise and very turbulent. Since the air scoop at the front is slightly larger than a shroud 40 and the rim 32, the air has been slightly compressed and has been made turbulent by passing through the first rotor. This increased pressure of air together with the turbulence effectively increases the power extractable by the second rotor.

A modified embodiment of the above device also provides even more power from the second rotor. Looking at FIG. 7, this embodiment shows the pimary rotor structure 200 with the secondary rotor structure 300. The primary rotor structure has an outer rim 222 provided with a flared imput portion thereto 262. A guide vane 264, is also provided, which may be of a fixed type, or adjustable, as desired. Only a couple of such guide vanes are shown in this view, but normally a plurality or multiplicity of same will be provided if used at all. The inner hub portion 224 of this embodiment has the inner ends of the rotor blades 226 and 228 welded thereto in a manner similar to that of the front rotor of the above embodiment. These inner portions of the rotor blades are formed similar to that shown in FIG. 5 of the above embodiment, while the outer portions 226' and 228' are shaped and formed as in the FIG. 6 view. The hub 224 is approximately secured to a central drive shaft 250 and connected in turn to a power takeoff device 260.

The second rotor of this embodiment of the wind motor has a shroud structure 332 with a flared front extension thereto 362. Again, this flared shroud structure may be provided with fixed or adjustable vane structure 364. The blade structure 336 for the leading edge and 338 for the trailing edge is again provided similar to that shown for the rear rotor in FIGS. 2, 4, 5 and 6 of the above embodiment. Appropriate welding 235 and 335 is shown for the outer rotor structure and is also used on the inner drum connections. The second rotor structure 300 of FIG. 7 is mounted upon a tubular drive member 270 which is also connected to the power takeoff device 260. While mounting bearings and support structure for this embodiment are not shown, conventional type support structure of any desired type may obviously be used. Also, the normal connection to the power takeoff structure may be by gearing, belt and pulley mechanism, or other conventional-type connections. Also, the mounting of the structure should be such as to again allow the basic pivot point to be ahead of the overall structure so that it will be self-aligning into the prevailing wind as disclosed for the first embodiment.

The central drive shaft 250 and the tubular drive member 270 can be supported by structure such as is shown in FIG. 2 relative to the first embodiment of the invention, this supporting structure not being shown in FIG. 7 for convenience of illustration. Further, it is to be understood that the rotor structures 200 and 300 of FIG. 7 rotate in the same sense during operation thereof.

The operation of this embodiment will now be described. The prevailing wind enters as indicated by the flow arrows A and is slightly compressed by the shroud structure before rotating the first rotor in a clockwise direction as shown. The exhaust air flow B then passes on to the second rotor 300. However, this second rotor structure now has additional prevailing wind air intake provided by the tapered shroud 362, and if desired the guide vanes 364, for feeding additional wind into the second rotor. This will increase the overall power extracted from the wind by the second rotor. When the air leaves the first rotor, air B, it is rotating counterclockwise and is very turbulent. Since the air scoop 362 is larger in diameter than the shroud 222 of the first rotor, more air is captured and slightly compressed to pass through the second rotor. Air entering the air scoop is directed by the vanes 364 in a clockwise direction. It enters the turbulent mixing and compression chamber and mixes with the counterclockwise moving air from the first rotor, thus compressing it and making it more turbulent before striking the second rotor blades. Air then passes through the power producing section of the blades, i.e. the outer portion of the blades, in speeds approximately 30-miles per hour, all of this from an initial 15-mile per hour prevailing wind. Our tests indicate that in this embodiment the first rotor produces 40-45% of the takeoff power, while the second rotor produces 55-60%.

This device also may be constructed of steel, preferably of rust-resistant-type such as stainless steel, which will greatly reduce or eliminate maintenance and potential rust problems. Both devices will withstand extremely strong winds of high velocity without damage thereto, and will effectively produce desirable power from the wind with great efficiency.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:
1. Wind motor apparatus, comprising:

first and second means for collecting and receiving wind respectively for the purpose of rotation thereby, said first and second means each comprising a central hub, a plurality of blade members extending substantially radially from the hub, the inner ends of the blade members being attached to the hub, and rim means for housing the blade members, the outer ends of the blade members being attached to the rim means, the outer ends of the blade members being swept backwardly from the direction of air flow through the device at an angle thereto, the outer ends of each of the blade members having a leading edge portion of relatively short width and a trailing edge portion of relatively greater width, the leading and trailing edge portions being disposed substantially normal to each other, the relatively lesser width leading edge portion of each blade member substantially forming a 45° angle to the central rotational axis of the apparatus, the relatively greater width trailing edge portion of each blade member substantially forming a 45° angle to the central rotational axis and lying in a plane substantially normal to the plane in which the leading edge portion lies, the inner ends of each of the blade members having leading and trailing edge portions of substantially equal width, the leading and trailing edge portions of said inner ends being disposed substantially normal to each other, the inner ends of the blade members substantially blocking air flow through the central longitudinal portion of the apparatus proximous to the hubs; and, third means for interconnecting said first and second means to transfer useful power developed by said first and second means.

2. The apparatus of claim 1 wherein the angle at which the blade members are swept backwardly is approximately 10°.

3. The apparatus of claim 1 wherein the rim means comprise substantially cylindrical body members, air flow through the apparatus being along the longitudinal axis of the body members.

4. The apparatus of claim 3 and further comprising a substantially cylindrical shroud member disposed between the cylindrical body members, the longitudinal axis of the shroud member being coincidental with the longitudinal axes of the body members.

5. The apparatus of claim 1 wherein the third means comprises:

a central shaft, the hubs of the first and second means being drivingly attached to the shaft for rotation therewith; and, power takeoff means mechanically connected to the shaft for taking power from said shaft on rotation thereof.

6. The apparatus of claim 5 wherein the hubs are fixedly attached to the shaft.

7. The apparatus of claim 5 wherein one of the hubs is fixedly attached to the shaft, the apparatus further comprising a tubular drive member drivingly connected to the shaft, the other hub being attached to the tubular drive member, and means for utilizing the power from the shaft and the tubular drive member.

8. The apparatus of claim 1 and further comprising vane means disposed within at least one of the rim means for guiding the apparatus.

9. The apparatus of claim 1 wherein the rim means downstream of the air flow through the apparatus has a flared forward extension for channelling additional air flow into the apparatus.

* * * * *